United States Patent Office 3,340,298
Patented Sept. 5, 1967

3,340,298
PHENYLALKANOLAMINE DERIVATIVES
Karl Wismayr, Linz, Otto Schmid, Leonding, near Linz, and Rudolf Kilches and Gerhard Zölss, Linz, Austria, assignors to Osterreichische Stickstoffwerke Aktiengesellschaft, Linz, Austria
No Drawing. Filed June 5, 1964, Ser. No. 373,052
Claims priority, application Austria, June 11, 1963, A 4,677/63
11 Claims. (Cl. 260—562)

ABSTRACT OF THE DISCLOSURE

The compounds are phenyalkanolamine derivatives of the formula

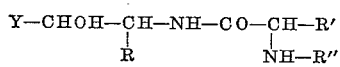

in which Y is selected from the group consisting of 2,5-dialkoxyphenyl and 2-alkoxy-5-hydroxyphenyl, where the alkoxy groups have one to four carbon atoms, 3,5-dihydroxyphenyl and 3-hydroxyphenyl, R is selected from the group consisting of hydrogen and methyl, R' is selected from the group consisting of hydrogen, alkyl having one to four carbon atoms, benzyl and p-hydroxybenzyl and R'' is selected from the group consisting of hydrogen and glycyl, and a non-toxic acid addition salt thereof. These compounds are useful for treating hypertensive conditions in view of their long lasting blood pressure increasing effect.

---

This invention relates to new phenylalkanolamine derivatives bearing an α-amino acid radical at the amino group, and their salts. These compounds are distinguished by the effect of increasing the blood pressure with a very long-lasting action. The invention also relates to a method of preparing these phenylalkanolamine derivatives.

It is well known that 1-(3',4'-dihydroxyphenyl)-2-aminoethanol-(1)-(noradrenalin) and its derivatives, for example the N-methyl derivative (Adrenalin) and 1-(3',5-dihydroxyphenyl)-2-aminoethanol-(1), have an excellent effect on blood pressure, although with only a very short action. If these substances are required to give a longer lasting effect, as is required, for example, in the treatment of patients having too low a blood pressure, then it was possible only by means of infusion, and in most cases this is impossible in practice.

The present invention provides compounds having the formula:

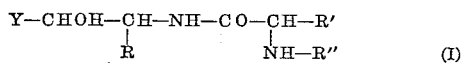

in which Y is a 2,5-dialkoxyphenyl group or 2-alkoxy-5-hydroxyphenyl group, where the alkoxy groups have one to four carbon atoms, a 3,5-dihydroxyphenyl group or a 3-hydroxyphenyl group, R is a hydrogen atom or a methyl group, R' is a hydrogen atom, an alkyl group having one to four carbon atoms, a benzyl group or a p-hydroxybenzyl group, and R'' is a hydrogen atom or a glycyl group and the salts thereof with non-toxic acids.

It has surprisingly been found that the compounds of this invention have an extremely long-lasting effect in increasing the blood pressure. Whereas the action of the above-mentioned known compounds is complete within 2 to 5 minutes, the action of the compounds of Formula I lasts for up to two hours depending upon the amino group substituents. For example, the compounds 1-(3',5'-dihydroxyphenyl) - 2 - glycineamido - ethanol-(1)-hydrochloride and 1-(3'-hydroxyphenyl)-2-glycineamido-ethanol-(1)-hydrochloride when used in doses producing a blood pressure rise of 30 to 40 mm. Hg require approximately one hour before the blood pressure drops to a level which is still 20% above the initial value. The compounds 1 - (2',5' - dimethoxyphenyl)-2-glycineamido-ethanol-(1)-hydrochloride and 1-(2',5'-dimethoxyphenyl)-2-glycylglycinamido-ethanol-(1)hydrochloride require more than 90 minutes while the compound 1-(2',5'-dimethoxyphenyl) - 2-glycineamido-propanol-(1)-hydrochloride requires more than 90 minutes while the compound 1-(2',5'-dimethoxy - phenyl)-2-glycineamido-propanol-(1)-hydrochloride requires more than 100 minutes. The compounds of this invention are very suitable for the treatment of hypertonic conditions because of this long-lasting action.

The present invention also provides a process for the preparation of a compound of Formula I which comprises reacting a phenylalkanolamine of the formula:

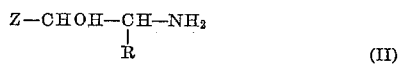

in which Z is a 2,5-dialkoxyphenyl or 2-alkoxy-5-benzyloxyphenyl group, where the alkoxy groups have one to four carbon atoms, a 3,5-dibenzyloxyphenyl group or a 3-benzyloxyphenyl group and R is as defined above, or a salt thereof, with an amino acid of the formula

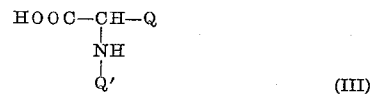

in which Q is a hydrogen atom, an alkyl group having one to four carbon atoms, a benzyl, p-benzyloxybenzyl or p-carbobenzoxybenzyl group, and Q' is a benzyl, carbobenzoxy, phthaloyl, benzylglycyl, carbobenzoxyglycyl or phthaloylglycyl group or with a mixed anhydride thereof or an ester thereof with an alcohol activated by a reactive group, to form a compound of the formula:

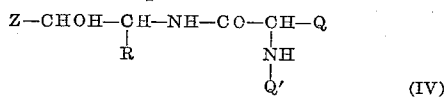

in which Z, R, Q and Q' are as defined above. Any radicals which can be split off by hydrogenolysis are then split off by catalytic hydrogenation and any phthaloyl radicals are split off with hydrazine and, if desired, any bases of Formula I are converted into salts or bases are liberated therefrom.

For example, an amino acid for Formula III may be reacted with a phenylalkanolamine of Formula II in the presence of a carbodiimide such as, for example, diisopropyl-carbodiimide or dicyclohexyl-carbodiimide as a water-splitting agent. Apart from the amino acids themselves, their reactive derivatives, such as their esters and anhydrides, are also suitable for the reaction. The esters used are those whose alcohol component is activated by a reactive group, as is the case, for example, with cyanomethyl esters, o- and p-nitrophenyl esters or carboethoxymethyl esters. Suitable anhydrides are mixed anhydrides of amino acids with other acids, for example isovaleric acid. If mixed anhydrides are used as the starting material, they need not always first be produced and isolated. In many cases it has been found advantageous to form the anhydrides in situ and to react the anhydrides-containing solution directly with the phenylalkanol amine.

Preferred amino acids of Formula III are the natural amino acids. These include, in particular, glycine, α-alanine, valine, leucine, phenylalanine and tyrosine. The dipeptidideglycylglycine is also excellent for the reaction.

Any phenolic hydroxyl groups and any amino functions which do not participate in the reaction must be protected in the reaction of the phenylalkanolamines of Formula II with amino acids of Formula III or their derivatives. The phenolic hydroxyl groups which are contained not only in the aromatic ring of the phenylalkanolamine but also in some cases (where tyrosine is used as amino acid component) in the amide group, are protected by a benzyl radical. The amino groups are protected in the conventional manner for peptide synthesis. Hydrogenolitically splittable radicals, such as the benzyl radical or the carbobenzoxy radical, can be used. The use of a phthaloyl radical as a protective group, which is split off with hydrazine, is also very favourable, particularly in the preparation of the N-glycylglycine derivative. Hydrogenolitically splittable radicals are generally preferable to other radicals for protection of the amino group, since the radicals protecting the phenolic hydroxyl groups and the radicals protecting the amino groups can then be split off in one operation. If the radicals protecting the amino group have to be split off by means of hydrazine, it is advisable for the splitting operation to be carried out before the hydrogenation for splitting off the hydrogenolytically splittable radicals. Hydrogenolysis is best carried out with catalytically activated hydrogen using Raney nickel or noble metals as catalyst.

The phenylalkanolamine of Formula II can either be used in that form or in the form of its salt for the reaction. In the latter case an equivalent quantity of a tertiary amine, for example triethylamine or dimethylaniline has to be added to the reaction mixture as an acid-fixing agent.

The compounds of Formula I can be isolated either in the form of free bases or as salts, the salts being the preferred pharmaceutical form of application. Suitable salts are those with physiologically compatible acids, for example hydrohalic acids, sulphuric acid, phosphoric acid, formic acid, acetic acid, propionic acid, lactic acid, tartaric acid, succinic acid, or citric acid.

Depending upon the choice of substituents and the amino acid component the compounds of Formula I have one or more asymmetrical carbon atoms so that a plurality of stereoisomeric forms exist. Racemates can be separated into the opposite optically active compounds in the conventional way by means of optically active acids.

The following examples illustrate the invention. The parts given in the examples are parts by weight.

*Example 1*

19.5 parts of carbobenzoxyglycine, 7.1 parts of triethylamine and 162 parts of dry toluene are mixed with 11.2 parts of isovaleric acid chloride at 0° C., to form the mixed anhydride and the mixture is agitated for two hours at 0° C. 32.4 parts of 1(3′,5′-dibenzyloxyphenyl)-2-aminoethanol-(1) are then added, the mixture is agitated for four hours at a temperature between 0° C. and +10° C. and then left to stand overnight at the said temperature. A thick crystal paste forms. The reaction product is dissolved in 450 parts of ethyl acetate and 200 parts of water. The ethyl acetate solution is separated, washed with hydrochloric acid, sodium bicarbonate solution and water, dried over sodium sulphate and inspissated. The inspissation residue is digested with 342 parts of xylene, the required product crystallising out. 34.9 parts of 1-(3′,5′-dibenzyloxyphenyl)-2-(N-carbobenzoxyglycineamido)-ethanol-(1) are obtained. Melting point: 109.5–111° C.

66.2 parts of 1-(3′,5′-dibenzyloxyphenyl)-2-(N-carbobenzoxyglycine-amido)-ethanol-(1) are hydrogenated in the presence of 6.6 parts of palladium carbon (10%) in 2000 parts of glacial acetic acid. When no more hydrogen is absorbed (3 moles of hydrogen are used), hydrogenation stops. The catalyst is removed by suction and the equivalent quantity of hydrochloric acid in ethanol is added to the filtrate with agitation. During further agitation at room temperature 28.6 parts of crude 1-(3′,5′-dihydroxyphenyl)-2-glycineamido-ethanol-(1)-hydrochloride crystallise, and are isolated and recrystallised from water-methanol for purification. 22.1 parts of pure product are obtained with a melting point of 235 to 236° C.

*Example 2*

7.0 parts of 1-(3′,5′-dibenzyloxyphenyl)-2-aminoethanol-(1), 4.2 parts of carbobenzyloxyglycine, 2.52 parts of diisopropylcarbodiimide and 80 parts of dry benzene are boiled under reflux for two hours. After being filtered from the resultant diisopropylurea, the solvent is inspissated in vacuo and the residue is recrystallised from 108 parts of diethylether. 11.2 parts of crude product are obtained (melting point 107 to 109° C.), which is again recrystallised from 43 parts of methanol for purification. 7.0 parts of 1-(3′,5′-dibenzyloxyphenyl)-2-(N-carbobenzoxyglycineamido)-ethanol-(1) are obtained. Melting point 110° to 112° C. Further processing to form 1-(3′,5′-dihydroxyphenyl)-2-glycineamido-ethanol-(1)-hydrochloride is as in Example 1.

Dicyclohexylcarbodiimide can be used instead of diisopropylcarbodiimide.

*Example 3*

3.5 parts of 1-(3′,5′-dibenzyloxyphenyl)-2-aminoethanol-(1), 2.5 parts of carbobenzoxy-glycine-cyanomethylester and 45 parts of ethylacetate are boiled under reflux for 3½ hours. 90 parts of ethyl acetate are added after cooling, and the solution is washed with water, hydrochloric acid, sodium bicarbonate solution and again with water, is dried over sodium sulphate and inspissated. After recrystallisation from 70 parts of xylene, 3.24 parts of 1-(3′,5′-dibenzyloxyphenyl)-2-(N-carbobenzoxyglycineamido)-ethanol-(1) are obtained: Melting point 108° to 110° C. Further processing to form 1-(3′,5′-dihydroxyphenyl)-2-glycineamido-ethanol-(1)-hydrochloride is as in Example 1.

The following compounds can be obtained in a similar way to each of Examples 1 to 3:

1-(3′,5′-dihydroxyphenyl) - 2 - (α-alanineamido)-ethanol-(1)-hydrochloride of melting point 201° to 202° C. (decomposition).

1-(3′,5′-dihydroxyphenyl) - 2 - norvalineamido-ethanol-(1)-hydrochloride, amorphous powder.

1-(3′,5′-dihydroxyphenyl) - 2 - valineamido-ethanol-(1)-hydrochloride, amorphous powder.

1-(3′,5′-dihydroxyphenyl) - 2 - leucineamido-ethanol-(1)-hydrochloride, amorphous powder.

1-(3′,5′-dihydroxyphenyl) - 2 - (phenyl-α-alanineamido)-ethanol-(1)-cyclohexylsulfamate of melting point 152° to 155° C.

1(-3′-hydroxyphenyl) - 2 - glycinamidoethanol-(1-hydrochloride of melting point 209° C. decomposition.

The following compounds can also be obtained by the method indicated in Examples 1 to 3 using 1-(dimethoxyphenyl)-2-aminoethanol and 1-(methoxybenzyloxyphenyl)-2-aminoethanol, and the corresponding propanol, respectively, as starting material, instead of 1-(dibenzyloxyphenyl)-2-aminoethanol:

1-(2′,5′-dimethoxypheyl) - 2 - glycineamido-ethanol-(1)-hydrochloride of a melting point of 192° to 193° C.

1-(2′,5′-dimethoxyphenyl) - 2 - leucineamido-ethanol-(1)-hydrochloride of a melting point of 130° C.

1-(2′,5′-dimethoxyphenyl) - 2 - glycylglycineamido-ethanol-(1-hydrochloride of a melting point of 191° to 193° C.

1-(2′,5′-dimethoxyphenyl) - 2 - glycineamido-propanol-(1)-hydrochloride of a melting point of 167° to 169° C.

1-(2′-methoxy - 5′ - hydroxyphenyl) - 2 - glycineamido-ethanol-(1)-hydrochloride of a melting point of 182.5° to 184° C. decomposition.

The corresponding 2′,5′-diethoxy-, 2′,5′-dipropoxy- and 2′,5′-dibutoxy compounds can be obtained similarly.

*Example 4*

35.9 parts of 1-(3′,5′-dibenzyloxyphenyl) - 2 - aminoethanol-(1), 30.9 parts of N-phthaloylglycylglycine-cyanomethyl ester and 460 parts of ethyl acetate are boiled under reflux and agitated for 5½ hours. After standing overnight the 1-(3′,5′-dibenzyloxyphenyl) - 2 - (N-phthaloylglycyl-glycineamido)-ethanol-(1) is isolated by suction, washed with ethyl acetate and dried. 37.4 parts are obtained, melting point 222° to 225° C.

19.6 parts of 1-(3′,5′-dibenzyloxyphenyl)-2-(N-phthaloylglycylglycineamido)-ethanol-(1), 314 parts of ethanol and 55 parts of molar alcoholic hydrazine hydrate solution are boiled under reflux for one hour. After standing overnight at room temperature the base which crystallises out is isolated by suction, washed with ethanol and dried. 19.65 parts of 1-(3′,5′-dibenzyloxyphenyl)-2-glycylglycineamido-ethanol-(1) are obtained. This product is then heated with 264 parts of ethanol to boiling and acidified with hydrochloric acid in alcohol, a solution forming. After standing overnight the crystallised hydrochloride is isolated and washed with cold ethanol. It is recrystallised from ethanol for purification. Yield 12.8 parts, melting point as from 183° C. decomposition.

7.8 parts of 1-(3′,5′-dibenzyloxyphenyl)-2-glycylglycineamido-ethanol-(1)-hydrochloride are hydrogenated at 50° C. and normal pressure in a conventional manner in the presence of 0.8 part of palladium carbon (10%) in 157.5 parts of glacial acetic acid and 40 parts of absolute ethanol. Two moles of hydrogen are used. After cooling to room temperature the mixture is filtered from the catalyst, the catalyst is washed with hot ethanol and the resultant filtrate is inspissated in vacuo in a nitrogen atmosphere. The inspissation residue is digested with acetone, the crystallised end product is isolated, washed with acetone and dried in vacuo. Yield (after recrystallisation from absolute ethanol), is 4.07 parts of 1-(3′,5′-dihydroxyphenyl)-2-glycylglycineamido-ethanol-(1)-hydrochloride.

The said product can also be obtained by hydrogenation of 1-(3′,5′-dibenzyloxyphenyl)-2-(N-carbobenzoxyglycyl-glycineamido)-ethanol-(1), which can be obtained by reaction of N-carbobenzoxyglycylglycine with 1-(3′,5′-dibenzyloxyphenyl)-2-aminoethanol-(1).

We claim:
1. A phenylalkanolamine derivative selected from the group consisting of a compound of the formula

$$\text{Y}-\text{CHOH}-\underset{\underset{\text{R}}{|}}{\text{CH}}-\text{NH}-\text{CO}-\underset{\underset{\text{NH}-\text{R}''}{|}}{\text{CH}}-\text{R}'$$

in which Y is selected from the group consisting of 2,5-dialkoxyphenyl and 2-alkoxy-5-hydroxyphenyl, where the alkoxy groups havet one to four carbon atoms, 3,5-dihydroxyphenyl and 3-hydroxyphenyl, R is selected from the group consisting of hydrogen and methyl, R′ is selected from the group consisting of hydrogen, alkyl having one to four carbon atoms, benzyl and p-hydroxybenzyl and R″ is selected from the group consisting of hydrogen and glycyl, and a non-toxic acid addition salt thereof.

2. The hydrochloride of a phenylalkanolamine of the formula

[structure: 2,5-dimethoxyphenyl with OCH₃ at two positions]
$$-\text{CHOH}-\underset{\underset{\text{R}}{|}}{\text{CH}}-\text{NH}-\text{CO}-\underset{\underset{\text{NH}-\text{R}''}{|}}{\text{CH}_2}$$

in which R is selected from the group consisting of hydrogen and methyl and R″ is selected from the group consisting of hydrogen and glycyl.

3. The hydrochloride of a phenylalkanolamine of the formula

[structure: 3,5-dihydroxyphenyl with HO at two positions]
$$-\text{CHOH}-\text{CH}_2-\text{NH}-\text{CO}-\underset{\underset{\text{NH}_2}{|}}{\text{CH}}-\text{R}'$$

in which R′ is selected from the group consisting of hydrogen and alkyl having one to four carbon atoms.

4. A non-toxic acid addition salt of 1-(2′,5′-dimethoxyphenyl)-2-glycineamido-ethanol-(1).

5. A non-toxic acid addition salt of 1-(3′,5′-dihydroxyphenyl)-2-glycineamido-ethanol-(1).

6. A non-toxic acid addition salt of 1-(2′,5′-dimethoxyphenyl)-2-glycineamido-propanol-(1).

7. 1-(2′,5′-dimethoxyphenyl) - 2 - glycineamido-ethanol-(1)-hydrochloride.

8. 1-(3′,5′-dihydroxyphenyl) - 2 - glycineamido-ethanol-(1)-hydrochloride.

9. 1-(2′,5′-dimethoxyphenyl) - 2 - glycineamido-propanol-(1)-hydrochloride.

10. 1-(2′,5′-dimethoxyphenyl) - 2 - glycylglycineamido-ethanol-(1)-hydrochloride.

11. 1-(3′-hydroxyphenyl) - 2 - glycineamido-ethanol-(1)-hydrochloride.

References Cited

UNITED STATES PATENTS 2,719,862  10/1955  Bruce et al. _____ 260—562 X

FOREIGN PATENTS 1,041,052  3/1959  Germany.

OTHER REFERENCES

Guggenheim: Chem. Abst., vol. 8, page 758 (1914).
The Merck Index, 7th ed., pages 104–5 and 405, Rahway, N.J., Merck, 1960.
McLean in: Burger Medicinal Chemistry, 2nd ed., pages 594–5 (New York), Interscience, 1960.

WALTER A. MODANCE, *Primary Examiner.*

N. TROUSOF, *Assistant Examiner.*